Jan. 2, 1940.   F. O. HICKLING   2,185,339
ANTIFRICTION BEARING
Filed Aug. 26, 1937
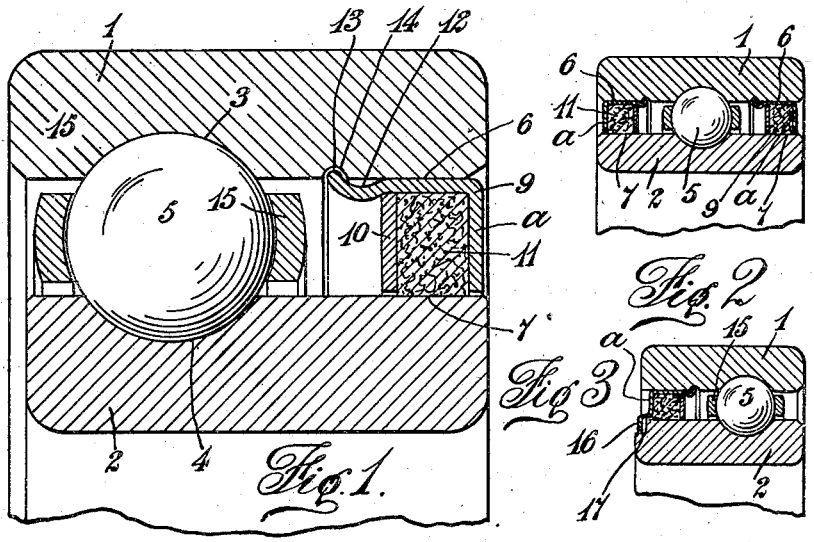
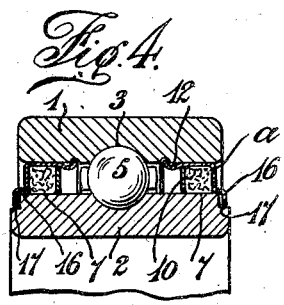
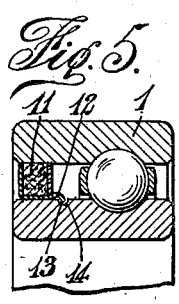
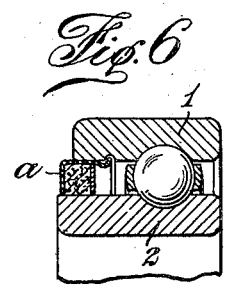
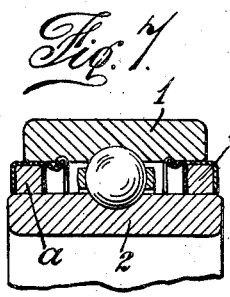
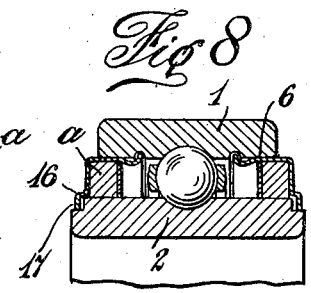
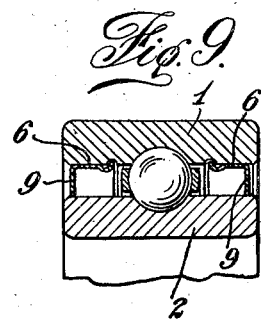
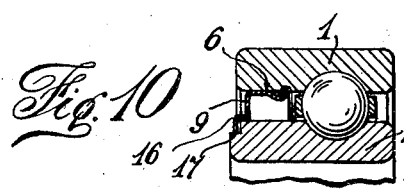
Inventor
Fred O. Hickling Patented Jan. 2, 1940

2,185,339

UNITED STATES PATENT OFFICE 2,185,339

ANTIFRICTION BEARING

Fred Osgood Hickling, Nottingham, England, assignor to Ransome and Marles Bearing Company Limited, Newark-on-Trent, England, a British company Application August 26, 1937, Serial No. 161,130
In Great Britain September 21, 1936

2 Claims. (Cl. 308—187.2)

This invention relates to improvements in antifriction bearings and particularly to shielding or sealing means to prevent leakage of lubricant and the entrance of foreign matter into the bearing.

The object of the present invention is to provide a bearing with a grease shield or seal or the like which will have concentricity and a satisfactory fitting in the bearing.

A further object is to provide a grease seal or the like which will be wholly positioned within the ring members of an antifriction bearing unit of any type, the arrangement being such that the seal will be concentric with the bearing tracks.

With these and other objects in view the invention consists in fitting within an antifriction bearing a grease shield or a grease seal or the like the periphery of which is adapted to contact with the surface of one of the rings in such a manner that the shield or seal will be definitely located concentrically with the other ground portions.

The invention further consists in fitting within the outer ring of an antifriction bearing a grease or lubricant retaining seal comprising a ring member or ring like casing carrying a resilient pad or the like the outer diameter of the ring member fitting into the bore of the outer bearing ring in such a manner that the seal will be maintained in a concentric position.

The invention further consists in providing a groove within one of the bearing rings to receive a pressed concentric extension of the grease seal casing whereby the said grease seal can be readily located in position and prevented from working loose during service.

The invention will now be described with reference to the accompanying drawing, in which—

Figure 1 is a part sectional elevation of a ball bearing showing one form of grease seal constructed according to this invention;

Figure 2 is a similar view showing a grease seal at each side of a ball bearing;

Figure 3 is a similar view to Figure 1 showing a modified form of seal for a stepped inner bearing ring;

Figure 4 is a similar view showing a double stepped bearing;

Figure 5 is a part sectional elevation showing a grease seal connected with the inner ring of a bearing;

Figures 6 and 7 are similar views showing single and double grease seals respectively partly supported by the outer ring of a bearing;

Figure 8 is a part sectional elevation showing grease seals partly supported at each side of a ball bearing having a stepped inner ring;

Figure 9 is a part sectional elevation of a ball bearing showing a grease shield supported at each side of the bearing track, and Figure 10 is a similar view showing a grease shield at one side of a ball bearing having a stepped inner ring.

According to one form of this invention the outer and inner bearing rings 1 and 2 respectively of an antifriction bearing such as a ball bearing as shown in Figure 1 are extended in width on one side of the rolling tracks 3 and 4 for the balls 5 and the tracks 3 and 4 and adjacent surfaces 6 and 7 of the outer and inner rings 1 and 2 are ground so that ground seating surfaces will be provided for a grease or lubricating seal $a$ which is inserted within the extension of the rings 1 and 2 The grease or like seal $a$ comprises a preferably pressed metal ring 9 of substantially L shape in cross section and an apertured disc 10 positioned within the ring 9 in such a manner as to provide a boxing to retain an annular felt or other flexible pad 11 or pads to act as a seal. The diameter of the aperture in the pad 11 is slightly less than the diameter of the apertures in the ring 9 and disc 10 so that only the pad 11 will contact with the ground surface of the inner ring 2 and thus prevent the entrance of foreign matter to one side of the bearing and act to retain the lubricant therein. The L shaped metal ring 9 is extended inwardly at 12 and shaped or pressed so as to retain the disc 10 in position against one side of the pad 11 and the outer edge of this concentric extension 12 of the ring 9 is curved or pressed outwardly at 13 so as to provide locating means for the seal by engaging in a groove 14 formed in the ground surface of the outer ring 1. This groove 14 is arranged adjacent to and concentric with the ball track 3 in the outer ring 1 and is of such size that the outward extension 13 of the seal does not necessarily fit therein, but acts as positioning means when the grease seal $a$ is pressed into place. Further the arrangement is such as to provide an additional assurance against the grease seal member $a$ working loose during service. It will be seen that by this arrangement the outer surface of the grease seal casing 9 will seat and engage with the preferably ground inner surface 6 of the outer ring 1 and thus the grease seal $a$ will be held in a concentric position and will be prevented from sliding out of position by its rim 13 engaging in the groove 14. The resilient pad 11 and boxing of the grease seal is of such width as to provide a substantial bearing surface. The balls 5 are shown as mounted in a retaining cage 15 but obviously the bearing may be a ball or roller bearing of any type.

In a slightly modified construction as shown in Figure 2 a grease seal $a$ is fitted in the manner previously described to each side of the track of a ball bearing; in this case the outer and inner rings 1 and 2 have their adjacent surfaces 6 and 7 ground so as to provide seating surfaces for the grease seals. If desired, the grease seal $a$ may be shaped to fit into a stepped inner ring. In this case the vertical wall of the L shaped pressed metal ring 9 is extended or formed with an additional L shaped portion 16 which is adapted to lie in the stepped recess 17 of the inner bearing ring 2. In Figure 3 a grease seal $a$ is shown fitted to one side of the bearing and in Figure 4 to both sides of the bearing. It will be understood that the grease seal $a$ may be so formed that the pad 11 will bear on the outer ring 1.

Figure 5 shows such an arrangement in which the seal is retained by providing the groove 14 in the inner ring 2. When a grease seal is fitted to each side of the ball or roller bearing the inner ring is formed with a pair of grooves 14 one each side of the ball or roller and the bearing rings are lengthened accordingly. In all the above cases the grease pad or pads are arranged wholly within the bearing unit and thus outward projections of the grease seal are avoided. In certain cases however, it is necessary or desirable to reduce the length of one or other of the ring members and Figures 6 and 7 show single and double grease seal arrangements, respectively, and Figure 8 shows a double stepped inner ring 2 similar to Figure 4 but with the outer ring 1 of shorter length. In all these latter cases however, a substantial portion of the grease seal has a bearing on the ground inner surface 7 of the outer ring. Figures 9 and 10 show by way of example ball bearings fitted with grease shields. In these cases the felt pads 11 and pad retaining discs 10 are omitted. It will be seen from the above description that the seal or shield is held by means of its fitting diameter into the ground surface on the bearing member, the groove 14 in the bearing member being merely included as a safeguard and as a guide to assist the assembling of the bearing unit.

What I claim is:

1. A grease seal for antifriction bearings of the type including outer and inner bearing rings, with an interposed antifriction bearing, the rings laterally of the bearing being ground inwardly of their free edges and on proximate faces, the seal including a metallic housing made up of an L-shaped member having a material length axially of the housing and cooperating directly with the ground surface of the outer bearing ring, a disk bearing against the inner surface of the L-shaped housing in parallelism to the lateral leg of such housing, and a sealing pad arranged between the lateral leg of the L-shaped member and the disk and bearing on the ground surface of the inner bearing ring to provide a seal, the cooperation of the axial portion of the L-shaped member of the housing and the ground surface of the ring serving as a seal against leakage and to maintain an even intimate frictional cooperation between the L-shaped member and the outer ring to maintain said L-shaped member in exact predetermined relation to the antifriction element in all conditions of use.

2. A construction as defined in claim 1, wherein the L-shaped member of the housing has that area in contact with the ground surface of the outer bearing ring extended inwardly toward the antifriction bearing and terminally formed to seat loosely in a channel in the inner wall of the outer ring to prevent axial displacement of the seal.

FRED OSGOOD HICKLING.